United States Patent Office 2,788,928
Patented Apr. 16, 1957

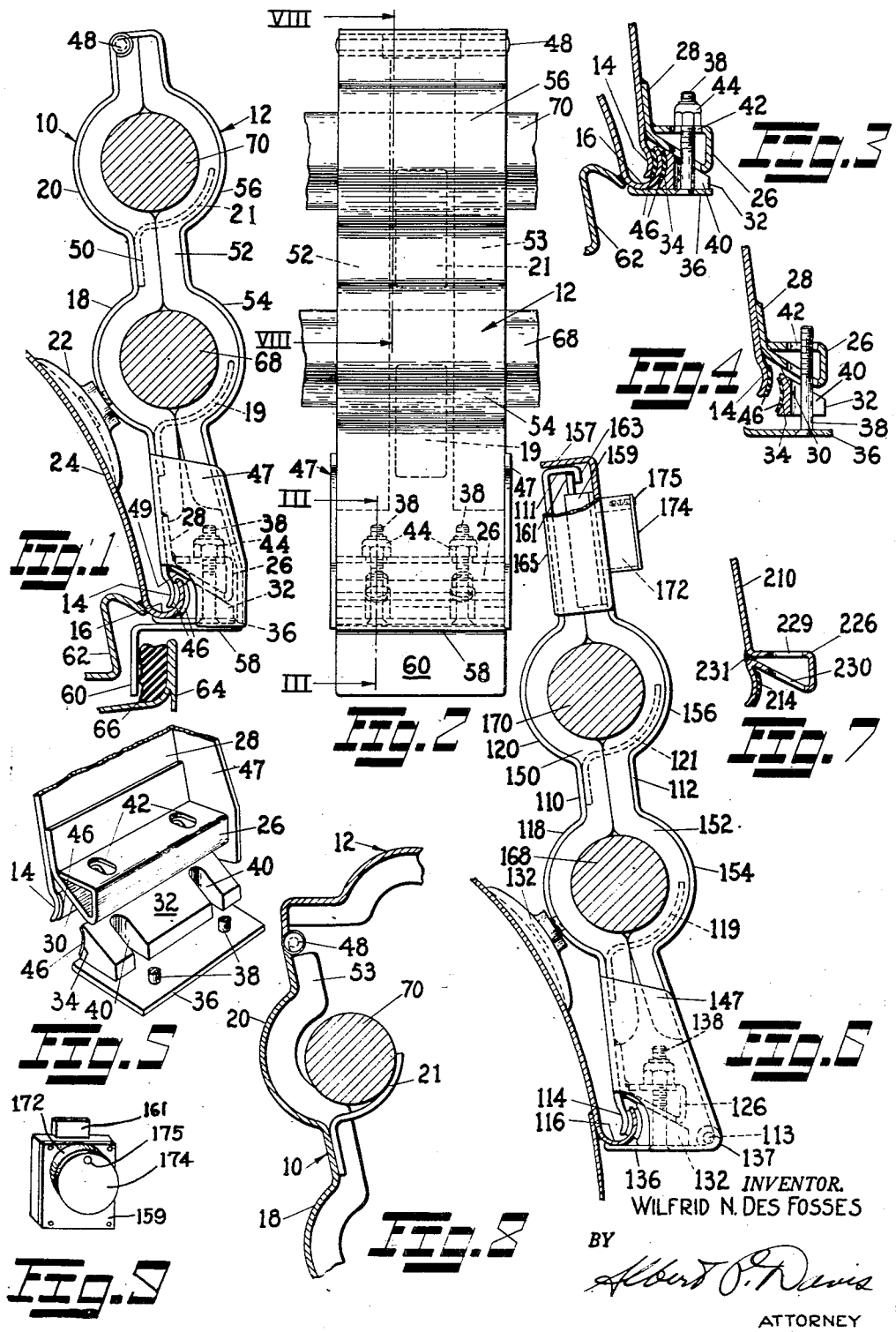

2,788,928
ARTICLE HOLDER FOR ATTACHMENT TO A VEHICLE

Wilfrid N. Des Fosses, Central Falls, R. I.

Application March 26, 1953, Serial No. 344,729

16 Claims. (Cl. 224—42.1)

The present invention relates to a holder for removably securing articles to a vehicle and more particularly pertains to a holder for removably securing fishing rods to an automobile.

Many of the fishing rods used by anglers are of such a length that even when disassembled they can not be conveniently carried in an automobile. Also, many anglers prefer to assemble their rods prior to leaving home with the result that even those rods which otherwise could be stored in an automobile present a transportation problem. Attempts have been made in the past to provide brackets or holders adapted to be removably secured to the top or side of automobiles to carry fishing rods and other rod-like objects. However, all of these prior art devices possess several disadvantages that make them undesirable. The major disadvantages of the prior art devices are their inability to securely grip the automobile with the result that they often come loose and cause the loss or destruction of the rods carried thereby, and the lack of facilities for locking the rods to the automobile so that they can be stolen or tampered with if the automobile is left unattended.

It is accordingly one object of the present invention to provide a holder for fishing rods that can be detachably secured to an automobile and which will not accidentally come loose.

Another object of the present invention is to provide a holder for fishing rods having means for detachably securing it to the drain gutter of an automobile in such a manner that it cannot accidentally come loose.

Another object of the present invention is to provide a holder for fishing rods adapted to be removably attached to an automobile and having means to prevent the unauthorized removal of the fishing rods therefrom.

Another object of the present invention is to provide a holder for fishing rods adapted to be removably attached to an automobile and having locking means to prevent the unauthorized removal of the fishing rods therefrom.

Another object of the present invention is to provide a holder for fishing rods adapted to be detachably secured to an automobile and having locking means for preventing the unauthorized removal of the holder from the automobile or the fishing rods therefrom.

Another object of the present invention is to provide a holder for fishing rods adapted to be detachably secured to the drain gutter of an automobile and adapted to cooperate with the automobile door to prevent the unauthorized removal of the holder from the automobile or the fishing rods therefrom.

Other objects of the invention will be obvious and will in part appear hereinafter.

The invention accordingly comprises the product possessing the features, properties and relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein:

Figure 1 is a side elevation of one embodiment of a fishing rod holder incorporating the present invention shown attached to the drain gutter of an automobile;

Fig. 2 is a front elevation corresponding to Fig. 1;

Fig. 3 is a fragmentary sectional view taken on line III—III of Fig. 2 and looking in the direction of the arrows;

Fig. 4 is a fragmentary sectional view similar to Fig. 3 but showing the clamping members open preparatory to being placed on the drain gutter of an automobile;

Fig. 5 is a fragmentary perspective view similar to Fig. 4;

Fig. 6 is a side elevation of a second embodiment of a fishing rod holder incorporating the present invention shown attached to the drain gutter of an automobile;

Fig. 7 is a fragmentary side elevation of another embodiment of the invention;

Fig. 8 is a fragmentary sectional view taken on the line VIII—VIII and showing the rod securing member in open position; and Fig. 9 is a perspective view of the lock employed in the embodiment of Fig. 6.

Virtually all closed model automobiles in use today are equipped with a rigid metal drain gutter along each side of the automobile roof and adjacent its doors. The present invention comprises a holder for fishing rods, or other rod-like objects, provided with means to removably and securely attach it to the drain gutter of an automobile, and being so constructed and arranged that when the holder is closed to its rod holding position the attaching means are enclosed and inaccessible. Locking means are provided whereby the holder can be locked in closed position to effectively prevent unauthorized removal of rods from the holder or the holder from the automobile.

It will be understood that rod holders incorporating the present invention are used in pairs. That is to say, the holders are mounted as near as is practical to the front and back of the automobile body so that the fishing rods carried thereby will be gripped on or adjacent their butt or handle and again in the vicinity of their tip. Referring now to Figs. 1 through 5 of the drawing wherein there is disclosed a fishing rod holder adapted to be locked in its closed rod holding position and also locked on an automobile by having a portion thereof engaged by the automobile door. The rod holder of Figs. 1 through 5 comprises a rod supporting and car engaging member 10 and a front rod securing and locking member 12. Both rod supporting and securing members 10 and 12 are preferably formed of sheet metal suitably cut and shaped, but it will be understood that they, as well as other components of the holder, can be cast to shape or can be formed or molded from a plastic having sufficient strength for the intended purpose. The lowermost end of rod supporting member 10 is bent or curved, as at 14 to provide an arcuate clamping jaw that conforms to the curvature of the inside of the automobile drain gutter 16. Rod supporting member 10 is bent rearwardly intermediate its ends to provide two arcuate rod engaging sockets 18 and 20. A rubber suction cup 22 is fixed to lower socket 18 by any convenient means as, for example, a stud molded into its base, to grip the automobile top or roof 24 to prevent the rod holder from vibrating and to serve as supplementary attaching means. A pair of upwardly turned curved fingers 19 and 21, preferably covered with a thin layer of rubber or plastic, are affixed to member 10 by any convenient means as, for example, spot welding, adjacent the lower edges of sockets 18 and 20 respectively. Fingers 19 and 21 are adapted to serve as temporary rod supporting brackets to hold in place rods to be secured in the holder of the present invention until such time as front rod securing and locking member 12 is closed. Fingers 19 and 21 are shown as being formed from separate pieces of material that are secured to member 10, it will be understood, however, that these fingers can be formed integrally with member 10 by striking them from said member and bending them into the desired position.

A wedge-shaped member 26, formed by bending a sheet of metal back upon itself so that it has a triangular cross-section, is secured at one of its apices to rod supporting member 10 adjacent curved jaw 14 by means of tab 28. The lower surface of wedge-shaped member 26 slopes downwardly and away from rod supporting member 10 to provide a cam surface 30 adapted to cooperate with a wedge-shaped jaw 32 to force said jaw against the outside of the automobile drain gutter in a manner to be described more in detail hereinafter. The face of jaw 32 adjacent curved jaw 14 is concave, as shown at 34, and the curvature of the concave portion corresponds to the curvature of the outside of the automobile drain gutter. A clamping plate 36 engages the lower surface of jaw 32 and is provided with a pair of upstanding screws 38 which pass through slots 40 in jaw 32 and elongated holes 42 in wedge-shaped member 26. Nuts 44 threadedly engage screws 38 and bear against the upper surface of wedge-shaped member 26. It will be seen, therefore, that rod supporting member 10 can be securely attached to an automobile by locating curved jaw 14 inside of the automobile drain gutter and tightening nuts 44 to draw clamping plate 36 and jaw 32 upwardly. Upward movement of jaw 32 brings its upper camming surface into contact with cam surface 30 of member 26 whereupon further upward movement causes said cam surfaces to force said jaw 32 rearwardly towards curved jaw 14 to thereby firmly clamp drain gutter 16 between jaws 14 and 32. Clamping plate 36 is of sufficient length so that its innermost edge is located beneath drain gutter 16. Therefore, the vertical movement imparted said plate by tightening nuts 44 to clamp jaws 14 and 32 draws said innermost edge against the bottom of said gutter to apply yet another clamping force to the gutter to prevent any vertical movement of the holder. It will also be seen that in the event nuts 44 are not tightened to the point where jaws 14 and 32 prevent all movement of member 10 the holder cannot fall off, or be removed, from the automobile because clamping plate 36 will effectively prevent the necessary upward movement. To remove the holder from the automobile it is necessary to loosen nuts 44 a considerable distance so that screws 38 can be slid forwardly in elongated holes 42 to thus withdraw plate 36 from beneath the gutter and so that wedge-shaped jaw 32 can be moved forwardly to free the gutter edge. The faces of jaws 14 and 32 are preferably covered with a thin sheet of rubber, cork or fabric 46 to prevent damage to the finish of the gutter.

Each side of the rod supporting member 10 is provided adjacent its lower end with a forwardly bent ear or tab 47. Tabs 47 together with supporting member 10 enclose the clamping mechanism, and particularly nuts 44, on three sides so that access may be had to said nuts to clamp the holder on an automobile, or release it therefrom, only from the front. Notches or cut away portions 49 are provided in the rear of the lower edges of tabs 47 to provide access openings through which drain gutter 16 can pass.

Rod securing and locking member 12 is hinged to the upper end of supporting member 10 by means of pin 48 which passes through aligned openings formed by rolling the upper ends of both of said members 10 and 12. In its closed or locking position securing member 12 extends forwardly from its hinge connection at substantially right angles to member 10 for a distance equal to the thickness of the two rubber packing strips 50 and 52 which face the inner surfaces of the left side of said members and the two rubber packing strips 51 and 53 which face the surfaces of the right side of said members. Member 12 then extends downwardly generally parallel to member 10 and is provided, intermediate its ends, with two arcuate rod engaging sockets 54 and 56 which are in alignment with and cooperate with sockets 18 and 20. The lower end of member 12 is bent rearwardly to form a flange 58 which fits under clamping plate 36 and which has a depending lip 60 formed along its inner edge. Flange 58 forms such an angle with member 12 that when said member is in its closed position said flange is substantially parallel to and in contact with, or closely adjacent to, clamping plate 36. Furthermore, the angle between flange 58 and member 12 is such that said flange and said member must bend or flex slightly to permit said flange to pass over the front edge of clamping plate 36 as member 12 is closed or opened. As a result of this, flange 58 and clamping plate 36 cooperate to function as a spring latch to releasably maintain the holder in its closed rod holding position. It will also be noted that when member 12 is in its closed position it completes the enclosure of the clamping means so that it is impossible to loosen nuts 44 to remove the holder from an automobile while it is closed.

Flange 58 is of such a length that when securing and locking member 12 is in its closed position its inner end extends past drain gutter 16 to a position closely adjacent to the automobile door frame 62 and depending lip 60 extends downwardly closely adjacent said door frame. It will, therefore, be seen that when door 64 is closed the rubber sealing gasket 66, carried by the rim of door 64, will press against lip 60 to thereby hold securing and locking member 12 closed. It will also be apparent that locking door 64 will also lock the holding member in its closed position and thereby prevent the unauthorized removal of fishing rods contained in sockets 18, 54 and 20, 56, or the removal of the holder from the automobile.

The above described rod holder operates in the following manner. Front rod securing and locking member 12 is opened and nuts 44 are loosened a sufficient amount to permit clamping plate 36 and jaw 32 to be drawn forward. Jaw 14 is then placed inside gutter 16 and the holder is located longitudinally of the automobile in the desired position but within the longitudinal confines of one of the automobile doors. Nuts 44 are tightened to bring jaws 14 and 32 and clamping plate 36 into loose engagement with gutter 16. Suction cup 22 is pressed against roof 24 to cause it to grip said roof and the tightening of nuts 44 is completed to draw jaws 14 and 32 and clamping plate 36 firmly against the gutter. The above procedure is repeated to mount the second rod holder in its desired position spaced from the first holder but also within the longitudinal confines of one of the doors. Rods 68 and 70 are then positioned in sockets 18 and 20 and are supported therein by fingers 19 and 21 until locking members 12 are closed to confine the rods. It should be noted that rubber packing 50, 51, 52 and 53 is of sufficient thickness and resilience to firmly grip different cross-sectional areas within reasonable limits as, for example the difference in cross-section between the tip of a fishing rod and its butt. After the rods 68 and/or 70 are in place and locking members 12 closed the automobile doors are closed to lock the holder closed.

The above-described embodiment of the invention is best adapted for use with automobiles of the so called four door sedan model having a front and rear door on each side. When used with automobiles of this type one holder will normally be positioned to cooperate with a front door, and the second will be positioned to cooperate with the rear door on the same side, thus making it possible to space the holders as far apart as necessary to best hold the fishing rods to be carried. It will be seen that when the above-described holder is used on a so called two door sedan, having one door only on each side, it may not be possible to space the two holders as far apart as might be desired inasmuch as both holders would have to be located within the longitudinal confines of a single door. The modification disclosed in Fig. 6 is intended for use when it is not convenient or desirable to have the holder cooperate with the automobile door to lock it in its closed position.

Rod supporting and car engaging member 110 of Fig. 6 is similar to rod supporting member 10 of Fig. 1 except that its upper end is bent over to form lock keeper 111 instead of being formed into a hinge bearing. Member 110 is provided with two rod engaging sockets 118 and 120, upwardly turned curved fingers 119 and 121, arcuate clamping jaw 114, suction cup 122, wedge-shaped member 126, and forwardly bent ears or tabs 147, all identical to the corresponding elements on member 10 and which function in the same manner. Clamping plate 136 is similar to plate 36 except that it extends forward a greater distance and is rolled over along its forward edge as at 137 to cooperate with at corresponding rolled edge along the bottom of front rod securing and locking member 112 and pin 113 to hinge said member 112 thereto. Clamping plate 136 carries screws 138 which pass through slots in wedge-shaped jaw 132 and elongated holes in wedge-shaped member 126. Nuts 144 threadedly engage screws 138 and upon being tightened draw plate 136 upwardly to securely clamp drain gutter 116 between jaws 114 and 132 and clamping plate 136.

As described above securing and locking member 112 is hinged to the forward edge of clamping plate 136. Therefore, it can be pivoted upwardly to a closed position wherein its sockets 154 and 156 cooperate with sockets 118 and 120 and rubber packing 150 and 152 to securely hold rods 168 and 170. The upper end of member 112 is provided with a rearwardly extending flange 157 adapted to extend over and cover lock keeper 111. Preferably the length of member 112 is such that flange 157 will frictionally grip lock keeper 111 to also function as a temporary latch to hold member 112 closed. A lock 159, having a reciprocating bolt 161, is located adjacent the upper end of member 112 and on the inner surface thereof so that when lock 159 is in its locked position bolt 161 will extend in back of depending lip 163 of lock keeper 111 to thereby lock said member 112 closed. Each side of member 112 is provided, adjacent lock 159 with a rearwardly extending tab 165 of sufficient length to bridge the space between the members 110 and 112 whereby said lock is completely enclosed when member 112 is closed. The barrel 172 of lock 159 extends through a suitable opening in the face of member 112. A cap 174 is pivotally secured to barrel 172 by means of pin 175 and is spring urged to a position wherein it covers the keyhole in said barrel to prevent rain and dirt from entering said barrel.

Fig. 7 illustrates a different manner of forming wedge-shaped members 26 and 126. The wedge-shaped member 226 of Fig. 7 functions exactly the same as wedge-shaped members 26 and 126 of Figs. 1 and 6 respectively but it is formed integrally with and from rod supporting and car engaging member 210 by bending a length of said member 210 adjacent arcuate clamping jaw 214 forwardly into a loop of triangular cross-section and securing the legs 229 and 230 by means of welding, brazing, soldering, etc., as at 231.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. An article holder for attachment to a vehicle having a drain gutter comprising an article supporting member, a pair of clamping jaws carried by said supporting member adapted to clamp a portion of said drain gutter therebetween, actuating means for moving said jaws together to secure said member to said gutter, a second member carried by said supporting member and selectively movable with respect thereto from a closed position covering said actuating means to an open position uncovering said actuating means, and locking means carried by one of said members for releasably holding said second member in said closed position.

2. An article holder for attachment to a vehicle having a drain gutter comprising an article supporting member, a pair of clamping jaws carried by said supporting member adapted to clamp a portion of said drain gutter therebetween, actuating means for moving said jaws together to secure said member to said gutter, a second member carried by said supporting member and selectively movable with respect thereto from a closed position adjacent said supporting member covering said actuating means and cooperating with said supporting member to hold an article therebetween to an open position uncovering said actuating means and releasing said article, and locking means carried by one of said members for releasably holding said second member in said closed position.

3. An article holder for attachment to a vehicle having a drain gutter comprising an article supporting member, a pair of clamping jaws carried by said supporting member adapted to clamp a portion of said drain gutter therebetween, actuating means including cam means for moving said jaws together to secure said member to said gutter, a second member carried by said supporting member and selectively movable with respect thereto from a closed position covering said actuating means to an open position uncovering said actuating means, and locking means carried by one of said members for releasably holding said second member in said closed position.

4. An article holder for attachment to a vehicle having a drain gutter comprising an article supporting member, a cam on said member, a fixed clamping jaw on said member and adjacent said cam, a movable clamping jaw carried by said member in contact with said cam and movable thereby toward said fixed jaw when it is forced thereagainst, actuating means for forcing said movable jaw against said cam whereby said cam forces said movable jaw towards said fixed jaw to clamp a portion of said gutter therebetween, a second member carried by said supporting member and selectively movable with respect thereto from a closed position covering said actuating means to an open position uncovering said actuating means, and locking means carried by one of said members for releasably holding said second member in said closed position.

5. An article holder for attachment to a vehicle having a drain gutter comprising an article supporting member, a pair of clamping jaws carried by said member and adapted to clamp the side of said drain gutter, an element extending beneath said jaws, actuating means for moving said jaws together to clamp said gutter therebetween and to move said element against the bottom of said gutter to thereby secure said member to said gutter, a second member carried by said supporting member and selectively movable with respect thereto from a closed position covering said actuating means to an open position uncovering said actuating means, and locking means carried by one of said members for releasably holding said second member in said closed position.

6. An article holder for attachment to a vehicle having a drain gutter comprising an article supporting member, a cam projecting from one face of said member, a fixed clamping jaw on said member and adjacent said cam, a wedge-shaped movable clamping jaw contacting said cam and movable thereby toward said fixed jaw when it is forced thereagainst, a plate contacting said movable clamping jaw on its side opposite said cam and extending beyond said fixed jaw, actuating means for moving said plate and said movable jaw towards said cam to force said movable jaw against said cam whereby said movable jaw is forced towards said fixed jaw to clamp the side of said drain gutter therebetween and said plate is brought into contact with the bottom of said gutter, a second member carried by said supporting member and selectively movable with respect thereto from an open position wherein said actuating means are uncovered to a closed position wherein said actuating means are enclosed between said supporting member and said second member, and locking means carried by one of said members for releasably holding said second member in said closed position.

7. An article holder for attachment to a vehicle having a drain gutter comprising an article supporting member, a cam on said member, a fixed clamping jaw on said member and adjacent said cam, a movable clamping jaw carried by said member in contact with said cam and movable thereby toward said fixed jaw when it is forced thereagainst, an element extending beneath said jaws, actuating means for moving said element against the bottom of said drain gutter and for forcing said movable jaw against said cam whereby said cam forces said movable jaw towards said fixed jaw to clamp the side of said gutter therebetween, and means for securing articles to said supporting member.

8. An article holder for attachment to a vehicle having a drain gutter and a door comprising an article supporting member, a pair of clamping jaws carried by said member adapted to clamp a portion of said drain gutter therebetween, actuating means for moving said jaws together to secure said member to said gutter, a second member carried by said supporting member and selectively movable with respect thereto from an open position wherein said actuating means are accessible to a closed position wherein said actuating means are enclosed, and locking means comprising a depending lip on said second member positioned thereon to be engaged by said door when said door is closed for holding said second member in said closed position.

9. An article holder for attachment to a vehicle having a drain gutter and a door comprising an article supporting member, a pair of clamping jaws carried by said member adapted to clamp a portion of said drain gutter therebetween, actuating means for moving said jaws together to secure said member to said gutter, a second member carried by said supporting member and selectively movable with respect thereto from an open position wherein said actuating means are accessible to a closed position wherein it cooperates with said supporting member to enclose said actuating means and to hold an article therebetween, and locking means comprising a depending lip on said second member positioned thereon to be engaged by said door when said door is closed for holding said second member in said closed position.

10. An article holder for attachment to a vehicle having a drain gutter and a door comprising an article supporting member, a pair of clamping jaws carried by said member and adapted to clamp the side of said drain gutter, an element extending beneath said jaws, actuating means for moving said jaws together to clamp said gutter therebetween and to move said element against the bottom of said gutter to thereby secure said member to said gutter, a second member carried by said supporting member and selectively movable with respect thereto from an open position wherein said actuating means are accessible to a closed position wherein said actuating means are enclosed, and locking means comprising a rearwardly extending flange on said second member underlying said element and a depending lip on said flange positioned thereon to be engaged by said door when said door is closed for holding said second member in said closed position.

11. An article holder for attachment to a vehicle having a drain gutter and a door comprising an article supporting member, a cam projecting from one face of said member, a fixed clamping jaw adjacent said cam, a wedge-shaped movable clamping jaw contacting said cam, a plate contacting said movable clamping jaw on its side opposite said cam and extending beyond said fixed jaw, actuating means for moving said plate towards said cam whereby said movable jaw is cammed towards said fixed jaw to clamp the side of said drain gutter therebetween and said plate is brought into contact with the bottom of said gutter, a second member pivotally mounted on said supporting member and movable from an open position wherein said actuating means are accessible to a closed position wherein it cooperates with said supporting member to enclose said actuating means and to hold an article therebetween, and locking means comprising a rearwardly extending flange on said second member underlying said plate, and a depending lip on said flange positioned thereon to be engaged by said door when said door is closed for holding said second member in said closed position.

12. An article holder for attachment to a vehicle having a drain gutter comprising an article supporting member, a pair of clamping jaws carried by said member adapted to clamp a portion of said drain gutter therebetween, actuating means for moving said jaws together to secure said member to said gutter, a second member carried by said supporting member and selectively movable with respect thereto from a closed position covering said actuating means to an open position uncovering said actuating means, and locking means comprising a keeper on one of said members and a movable keeper engaging bolt on the other of said members for locking said second member in said closed position.

13. An article holder for attachment to a vehicle having a drain gutter comprising an article supporting member, a pair of clamping jaws carried by said member adapted to clamp a portion of said drain gutter therebetween, actuating means for moving said jaws together to secure said member to said gutter, a second member carried by said supporting member and selectively movable with respect thereto from a closed position adjacent said supporting member covering said actuating means and cooperating with said supporting member to hold an article therebetween to an open position uncovering said actuating means and releasing said article, and locking means comprising a keeper on one of said members and a movable keeper engaging bolt on the other of said members for releasably locking said second member in said closed position.

14. An article holder for attachment to a vehicle having a drain gutter comprising an article supporting member, a pair of clamping jaws carried by said member and adapted to clamp the side of said drain gutter, an element extending beneath said jaws, actuating means for moving said jaws together to clamp said gutter therebetween and to move said element against the bottom of said gutter to thereby secure said member to said gutter, a second member pivotally mounted on said element and selectively movable with respect to said supporting member from a closed position adjacent said supporting member covering said actuating means and cooperating with said supporting member to hold an article therebetween to an open position uncovering said actuating means and releasing said article, and locking means comprising a keeper on one of said members and a movable keeper engaging bolt on the other of said members for releasably locking said second member in said closed position.

15. An article holder for attachment to a vehicle having a drain gutter comprising an article supporting member, a cam projecting from one face of said member, a fixed clamping jaw on said member adjacent said cam, a wedge-shaped movable clamping jaw contacting said cam and movable thereby toward said fixed jaw when it is forced thereagainst, a plate contacting said movable clamping jaw on its side opposite said cam and extending beyond said fixed jaw, actuating means for moving said plate and said movable jaw towards said cam to force said movable jaw against said cam whereby said movable jaw is forced towards said fixed jaw to clamp the side of said drain gutter therebetween and said plate is brought into contact with the bottom of said gutter, a second member pivotally mounted on said plate and selectively movable with respect to said supporting member from a closed position adjacent said supporting member covering said actuating means and cooperating with said supporting member to hold an article therebetween to an open position uncovering said actuating means and releasing said article, and locking means comprising a keeper on one of said members and a movable keeper engaging bolt on the other of said members for releasably locking said second member in said closed position.

16. An article holder for attachment to a vehicle having a drain gutter comprising an article supporting member, a pair of clamping jaws carried by said supporting member adapted to clamp a portion of said drain gutter therebetween, actuating means for moving said jaws together to secure said member to said gutter, and a second member carried by said supporting member and selectively movable with respect thereto and said actuating means from an open position remote from said actuating means to a closed position adjacent said supporting member and said actuating means wherein it renders said actuating means inoperable, and locking means carried by one of said members for releasably holding said second member in said closed position.

References Cited in the file of this patent

UNITED STATES PATENTS

| 2,248,170 | Hansen | July 8, 1941 |
| 2,461,897 | Hopkins | Feb. 15, 1949 |
| 2,575,458 | Merrill | Nov. 20, 1951 |
| 2,578,067 | Jensen | Dec. 11, 1951 |
| 2,603,394 | Beck | July 15, 1952 |
| 2,671,583 | Shaw | Mar. 9, 1954 |
| 2,682,982 | Fisher | July 6, 1954 |

FOREIGN PATENTS

| 490,642 | Canada | Feb. 17, 1953 |